Figure 1:
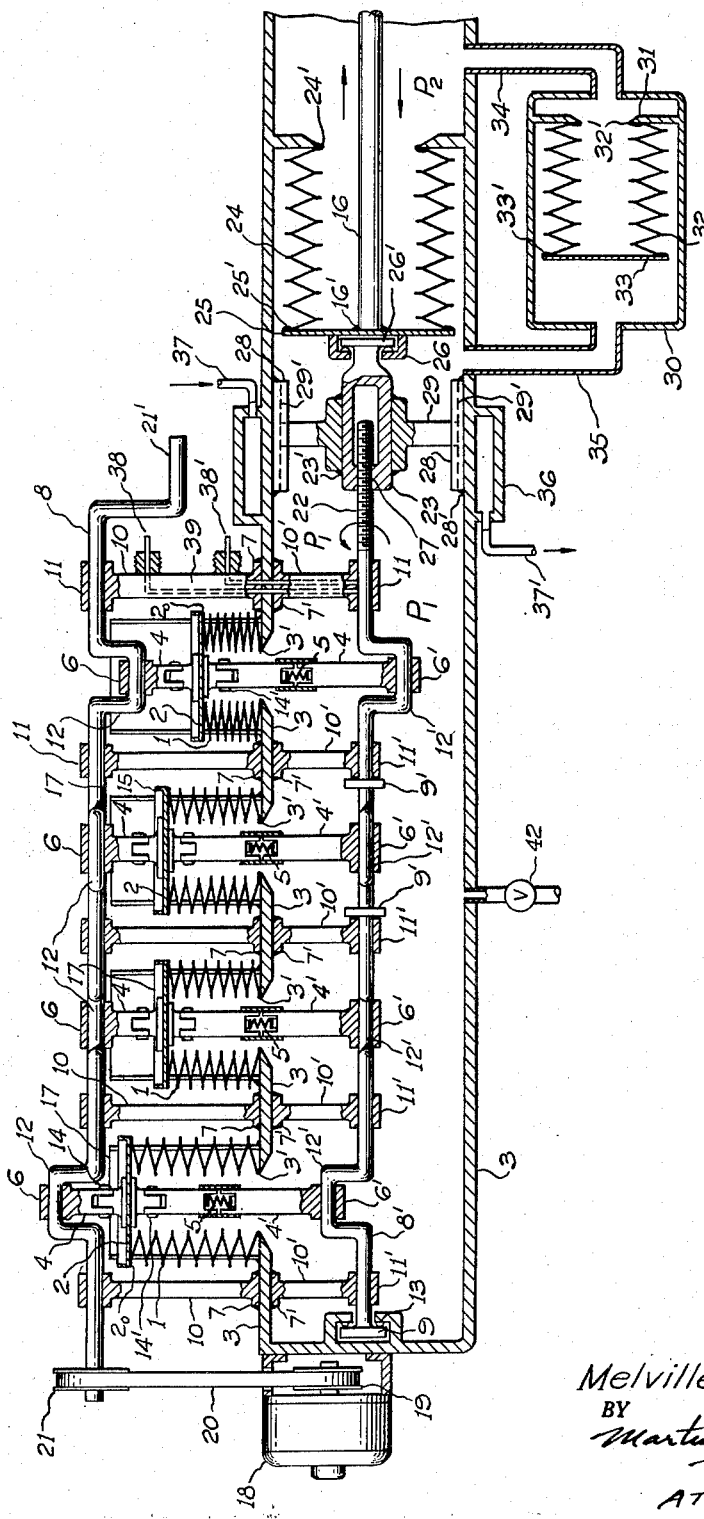

Jan. 14, 1958  M. F. PETERS  2,819,619
SEALED TRANSMISSION SYSTEM
Filed Dec. 15, 1954  2 Sheets-Sheet 1

INVENTOR.
Melville F. Peters
BY
Martin J. Finnegan
ATTORNEY

INVENTOR.
Melville F. Peters
BY
Martin J. Finnegan
ATTORNEY

2,819,619

SEALED TRANSMISSION SYSTEM

Melville F. Peters, Livingston, N. J.

Application December 15, 1954, Serial No. 475,475

6 Claims. (Cl. 74—67)

This invention relates to the transmission of power into a hermetically sealed chamber, as by imparting a reciprocating motion to one or more bellows units, and converting this motion through a mechanical assembly into a rotary motion or a linear displacement.

Recently valves have been installed in power stations and chemical plants to control fluids operating at high pressures and moving at high velocities which are sealed with bellows to eliminate the packing glands which are not tight enough to prevent the escape of poisonous gases from the system. These bellows sealed valves are opened or closed by rotating a threaded spindle attached to the valve disk in a threaded bonnet, so that the disk either executes a continuous linear motion, a continuous rotary motion, or a combination of the two motions.

In the conventional valve construction the stroke of the bellows is equal to the displacement of the valve stem. When the pressure differential across the bellows does not exceed 25 p. s. i. and the displacement is limited to 3 or 4 feet with an expected life of 5000 cycles, a bellows can be fabricated which has a compressed length of approximately 25 inches and an extended length of 73 inches. When the pressures are increased to 2500 p. s. i., a bellows having a four foot displacement would be impractical in many installations, because tests have shown that a bellows which can withstand 2500 p. s. i. must be 8.8 inches long to have a working stroke of ½ inch with an expected life of 5000 cycles and a length of 2 feet with an expected life of $10^6$ cycles. When a large displacement is required to operate a high pressure valve, a practical solution to the problem is to use in combination with the high pressure bellows a mechanism which can convert the short reciprocating motions permitted by the high pressure bellows into a motion which is continuous in direction and equal in magnitude to the sum of the small reciprocating displacements executed by the high pressure bellows. It is therefore the first object of the invention to use a mechanical assembly in combination with a bellows which is used to hermetically seal a valve chamber and to arrange the mechanical assembly so that it will move the disk, or plate, or other sealing cover of a valve a distance which is proportional to the number of reciprocating cycles executed by the bellows.

It is a second object of the invention to use a mechanical assembly to transmit a reciprocating motion to one or more bellows which are used as hermetic seals in a valve chamber, and by the use of a second mechanical assembly to convert the reciprocating motion transmitted through the seals into a rotary motion, or a linear displacement, or to a combination of these two motions. It is a third object of the invention to use a crankshaft to impart a reciprocating motion to a plurality of bellows units functioning to hermetically seal a chamber. It is a fourth object of the invention to use the rotary motion of a crankshaft to produce a reciprocating motion in a plurality of bellows units which are serving as fluid seals, and by use of a second crank-shaft convert the reciprocating motion of the bellows units into a rotary motion to perform work.

A fifth object is to provide guide elements to prevent distortion of the bellows units away from a true rectilinear path.

When the mechanical assembly in the valve must be sealed from the system to prevent the fluids from corroding the rubbing surfaces of the assembly, space can be saved by sealing the compartment housing the mechanical assembly with a low pressure bellows and pressurizing this compartment to the pressure in the system, so that a low pressure differential is maintained across the bellows. It is therefore a sixth object of the invention to make the pressure in the compartment of the valve chamber containing the mechanical assembly approach the pressure in the system, so that the pressure differential between the compartment and the system will not exceed the safe working pressure of the sealing bellows.

Either a gas or a liquid can be used in the compartment of the valve chamber to maintain the small pressure differential across the low pressure bellows. If a gas is used and the high pressure in the system is accidentally reduced, the pressure differential developed across the low pressure bellows may cause it to rupture. When a liquid is sealed in the chamber, a loss of pressure in the system, or a change in temperature of the liquid, will not subject the low pressure bellows to excessive pressures if the compartment is connected to an expansion tank. It is therefore a seventh object of the invention to seal a liquid in the compartment of the valve chamber containing the mechanical assembly and to protect the bellows from excessive pressure by connecting an expansion tank in shunt relation to the bellows separating the liquid in the valve compartment from the fluid in the system.

The expansion element attached to the chamber containing the mechanical assembly may be a bag enclosed in a chamber which changes in volume with a change in pressure, or it may be made according to my co-pending patent application, Number 416,463, which describes two bellows having different piston areas connected in series with their two free ends connected to parts of the valve. The action of the two bellows can be more readily understood by considering the two bellows replaced by two pistons with different cross sectional areas joined together with a rod, and positioned in two mating cylinders by a spring acting on the free end of each piston when the fluid pressure is the same on the inside and the outside of the cylinders. When the pressure on the inside of the two cylinders becomes greater than the pressure on the outside of the cylinders, the forces acting on the large piston will become greater than the forces acting on the small piston and consequently the piston assembly will move in the direction of the large cylinder until the forces exerted by the fluid and springs on the pistons are again in equilibrium. If the pressure on the outside of the two cylinders becomes greater than the pressure on the inside of the two cylinders, the piston assembly will be forced to move in the opposite direction and the volume within the two cylinders will be reduced. This combination of two bellows having different piston areas connected in series serving as an expansion tank has the additional advantage that it may also serve as a seal between the system and the compartment containing the mechanical assembly. It is therefore an eighth object of the invention to replace the expansion tank and the bellows serving as a seal between the system and the compartment with two bellows having different piston areas.

A bellows will experience a reciprocating motion when a pulsating pressure applied to one side of a bellows oscillates above and below the pressure applied to the other side of the bellows. Since the reciprocating motion of the bellows is established by the pressure differential across the bellows and is independent of the absolute pressure, it is possible to establish a reciprocating motion in a low pressure bellows operating in a high pressure system. This reciprocating motion of the bellows can then be converted in the valve chamber to a rotary motion or a linear displacement, so that low-pressure bellows can be used throughout the high-pressure valve. It is therefore a ninth object of the invention to impart a reciprocating motion to a bellows which is used as a fluid seal by applying a pressure to one side of the bellows which oscillates above and below the pressure applied to the other side of the bellows, so that the amplitude of the pulsations, or the number of pulsating cycles, or a combination of both, will determine the extent of rotary motion or linear displacement for operation of the valve.

The pulsating pressure may be applied to the bellows units from any suitable source not specifically illustrated herein, such as a reciprocating pump, preferably with an air cushion between the piston in the pump and the bellows, so that a leakage of the piston will not contaminate the fluid in the system.

In calculating pressure differentials precisely, it will be necessary to know the position and spring rate of the bellows. For most operations, however, these can be neglected, since they form only a small percentage of the forces affecting the bellows.

Figure 2:
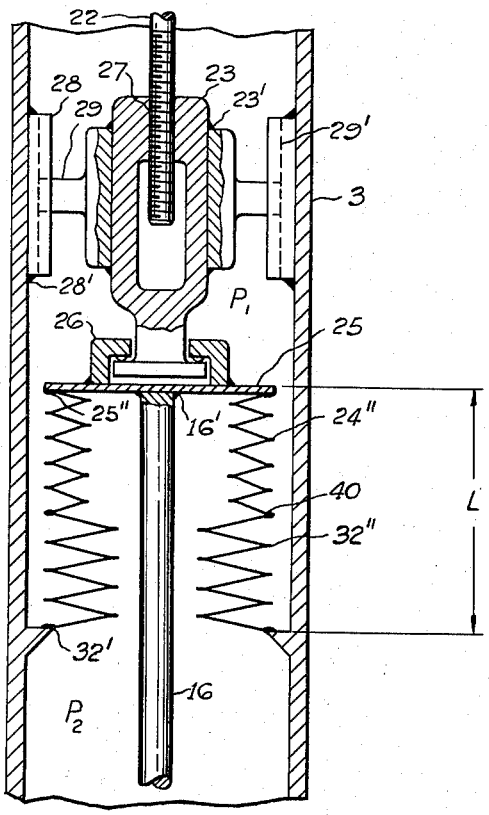

In the drawings:

Fig. 1 is a sectional view of one embodiment of the invention,

Fig. 2 a second embodiment, and

Fig. 3 a third.

To simplify the description, the parts which are alike in physical dimensions and perform the same duties but differ in their location on the chamber and in phase angle of operation, will be designated by the same number if they are on the outside of the chamber and by the primes of the same numbers if they are on the inside of the chamber. To eliminate the possibility of the bellows assembly stopping on bottom or top dead center, at least two and preferably three or more bellows assemblies should be used.

The chamber 3 in Fig. 1 has four openings and the four openings are hermetically sealed by welding one end of a bellows 1 at 3' and hermetically sealing the other end of the bellows by welding disks 2 at $2_0$. The five supports 10 for the five bearings 11 are secured to 3 at the five stations 7. A crank-shaft 8 with four offsets 12, 90 degrees apart, rotates in the five bearings 11. To each of the outer surfaces of the four disks 2 is attached a connecting rod 4 through the wrist-pin 14 and to the other end of each connecting rod is attached a bearing 6 which receives and allows the offset or throw 12 of the crank-shaft 8 to rotate. The supports 10' for the five bearings 11' are secured to 3 at the five stations 7'. The crank-shaft 8', which is a duplicate of the shaft 8, rotates in the five bearings 11'. To the inner surface of each of the four disks 2 is attached a connecting rod 4' through wrist-pin 14' and to the other end of each connecting rod is attached a bearing 6' which receives and allows the offset portion 12' of the shaft 8' to rotate, so that when shaft 8 is rotated by turning crank 21 or by motor 18 through the pulley belt combination 19, 20, 45, the shaft 8' will also rotate. To prevent the connecting rods 4 and 4' from tipping the bellows when the two shafts 8 and 8' are rotated, a piston-shaped element 15 sliding in the cylindrical guide 17 is attached to disk 2. To control the stresses developed in the assembly due to wear, changes in temperature, and to allow for manufacturing tolerances, a spring-loaded tubular type expansion chamber 5 is placed in 4' between 6' and 14', so that the connecting rod can change in length without bending. In place of the connecting rods and crank-shaft, a system of ratchets, or ball-and-inclined grooves, could be used.

The shaft 8' is prevented from moving along the axis of the chamber by the thrust bearing 9, 13, which is of standard construction, or by facing one or both ends of bearing 11' to act as a bearing surface for the cylindrical elements 9', which are secured to shaft 8' by a key or the like.

From the foregoing description, the line of action from the motor 18 to the driven shaft 16 will be seen to be as follows:

The motor 18 turns the pulley and belt combination 19, 20 and 45. The pulley 45 is connected to the crank shaft 8 which is coupled through connecting rods 14, 14' to crank shaft 8'. The end of the crank shaft 8' opposite the motor is threaded at 22 and is received within the threaded saddle 23. The saddle 23 converts the rotary motion of the crank shaft into linear motion by means of said threads. The rod 16 is connected to the saddle 23 through thrust bearing 26.

When the rubbing parts of the mechanical assembly must be sealed from the corrosive fluids in the system, one end of bellows 24 is welded to 3 at 24' and the other end is welded to disk 25 at 25'. The saddle 23 which converts the rotary motion of crank-shaft 8' into linear motion by means of thread 22 turning in thread 27, has a shoulder 26' which can rotate in the thrust bearing 26, so that the supporting plate 25, the sealing bellows 24 and the rod 16 is forced to travel the length of the screw thread 22 by a continuous rotation of 8', which in turn is forced into rotation by rotating the crankshaft 8. The linear movement of rod 16 is used to open or close a valve by a linear displacement of the valve disk, or to control the rods in a nuclear pile, or to do other useful work.

When the temperature in the system exceeds the temperature at which the rubbing parts of the mechanical assembly can be operated, a unit 36 is secured to 3 to limit the flow of heat between the lower part of 3 which is in contact with the fluids in the system and the upper part of 3 which houses the mechanical assembly. The fluid which controls the flow of heat between the upper and the lower parts of 3 is conducted in and out of 36 by pipes 37 and 37' respectively. To control the flow of heat along the crank-shaft 8', one or more of the supports 10 and 10' for bearings 11 and 11' can be supplied with fluid chambers similar to 39 and the fluid conducted in and out of 39 by pipes 38 and 38' respectively.

The overall length of chamber 3 can be greatly reduced by pressurizing chamber 3 through valve 42, so that the pressure differential $P_2-P_1$ will permit 24 to be a low pressure bellows. When the pressurizing fluid is a liquid, the expansion element 30 consisting of a bellows 32 capped on one end by welding plate 33 at 33' and the other end by welding to shoulder 31 at 32', should be shunted across the sealing bellows 24, by the two conduits 34 and 35, so that changes in volume caused by a movement of the four pistons in the mechanical assembly, or a displacement of bellows 24 by the rotating crank-shaft, or a change in temperature of the liquid filling chamber 3, will be compensated by a change in volume of the expansion element 30 by a movement of bellows 32. The pressure differential $P_2-P_1$ across bellows 24 and 32 can be made very small by making the spring rate of bellows 32 very small and the diameter very great, since the pressure differential between the system and chamber 3 will be equal to the spring rate of bellows 32 multiplied by the displacement from its neutral position divided by the effective or piston area of 32.

The bellows 24 and the expansion element 30 together with bellows 32, end plate 33 and conduits 34 and 35 can be replaced by the two bellows 24" and 32" shown in Figure 2. The two bellows are connected together at 40 and the free end of bellows 24" is connected to cap 25 at 25″ and the free end of bellows 32″ is connected to 3 at 32′. Since the effective or piston area of a bellows is equal to the sum of its inside and outside diameters squared, multiplied by $\pi/16$, the piston area of bellows 24″ must be greater than the piston area of bellows 32″, so that if the pressure $P_1$ is reduced, the pressure $P_2$ will compress bellows 32″ and decrease the volume in 3 without change in the overall length L of the two bellows, whereas if the pressure $P_1$ is increased, bellows 24″ will be compressed and the volume of 3 will be increased without a change in the overall length L, since the piston area of 24″ is greater than the piston area of 32″. In this way the pressure differential $P_2-P_1$, can be maintained at a relatively small percentage of the pressure $P_1$ and $P_2$ when the chamber 3 is filled with a non-compressible fluid and the movement of the saddle 23 by rotating the thread 22 follows the procedure given with Figure 1.

Figure 3:
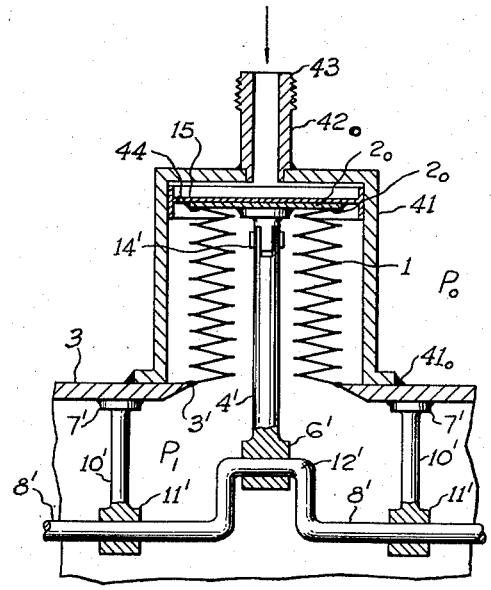

When the mechanical motion must be transmitted through bellows which are required to work at pressures so high that a plate thick enough to withstand the pressure would have little flexibility, it becomes necessary to use a relatively low pressure bellows to gain the required flexibility and to replace the crank-shaft 8 together with the other elements 4, 6, 10, 11, 12, 14, shown in Figure 1, with the fluid drive shown in Figure 3, where 1, 2, $2_0$ et seq., designates the same parts in both Figures 1 and 3. The fluid system consists of a fluid chamber 41 which also serves as a guide for 15 and is attached to 3 at 41 and a pipe $42_0$ with a threaded end or fitting 43.

At 44 are breather holes for equalizing the fluid pressure on both sides of 15. When a fluid pressure of $P_1$ plus delta $P_1$ is applied to chamber 41, the bellows will be compressed and the crank-shaft 8′ will turn until the throw 12′ is in what will be called bottom dead-center. If the pressure in 41 is now reduced to $P_1$ minus delta $P_1$ and the momentum of the system carries 12′ off dead-center, the bellows will elongate and the crank-shaft 8′ will turn until it is at top dead-center. If the pressure is again increased to $P_1$ plus delta $P_1$ and the throw is carried past top dead-center, the bellows will be compressed and the shaft 8′ again rotated until the throw is at bottom dead-center. By synchronizing the movement of 12′ from top dead-center to bottom dead-center with a pressure of $P_1$ plus delta $P_1$ and the movement of 12′ from bottom dead-center to top dead-center with the pressure $P_1$ minus delta $P_1$, the crank-shaft will rotate continuously in one direction. The direction in which the shaft will rotate will be determined by the position of the throw when the pressure is first applied. For example, if the application of a pressure of $P_1$ plus delta $P_1$ to bellows 1 causes the shaft to rotate in a clock-wise direction, the application of a pressure $P_1$ minus delta $P_1$ to bellows 1 will cause the shaft to rotate in a counter-clock-wise direction. In this manner the shaft may be rotated clock-wise or counter clock-wise and the valve opened and closed, or a weight raised or lowered by initiating the rotation with a pressure which is synchronized with the position of the throw of the crank-shaft. Stalling on dead center can be prevented by using a plurality of bellows or a fly-wheel. Since the drop in fluid pressure across bellows 1 is never greater than plus or minus delta $P_1$, the bellows is not subjected to the applied pressure $P_1$ and $P_2$ and consequently the limiting pressure in the system is determined by the bursting pressures of chamber 3 and 39.

I claim:

1. In a mechanical system including a motion-translating component for imparting rectilinear movement to a valve assembly controlling the flow of high pressure fluids into a chamber surrounding said valve assembly, the combination with said valve chamber of a second chamber surrounding said motion-translating component, a first bellows separating said two chambers, a second bellows assembly comprising a group of bellows units forming part of the closure means of said second chamber, a pair of crank-shafts having parallel crank bearings, connecting rods interconnecting said crank shafts at each successive pair of crank bearings, means for controlling the fluid pressure differential between said two chambers, to maintain a relatively low pressure differential acting upon said second bellows assembly, means for operatively connecting the second of said crank-shafts to said motion-translating components, and means for rotating the first of said crank-shafts, to initiate the valve control cycle.

2. A system as defined in claim 1, wherein said second crank-shaft, said motion-translating component, and said valve assembly have a common longitudinal axis which extends through both said chambers, and wherein said first crank-shaft is located outside both said chambers, with its longitudinal axis parallel to said first-named longitudinal axis.

3. A system as defined in claim 1, wherein said bellows units of said second bellows assembly extend outwardly from one wall of said second chamber, at aligned positions that are spaced along said wall to correspond to the spacing of said crank bearings.

4. A system as defined in claim 1, wherein said bellows units of said second bellows assembly are compressed by the crank bearings of said first crank-shaft, and are re-expanded by the fluid pressure differential within said second chamber.

5. A system as defined in claim 1, including means for guiding the bellows units of said second bellows assembly, to insure true rectilinear motion.

6. A system as defined in claim 1, wherein the bellows units of said second bellows assembly have parallel longitudinal axes that are perpendicular to the longitudinal axis of said first bellows assembly.

References Cited in the file of this patent

UNITED STATES PATENTS

| | | |
|---|---|---|
| 1,392,597 | Ricardo | Oct. 4, 1921 |
| 1,593,838 | Michelsen | July 27, 1926 |
| 2,471,596 | Williams | May 31, 1949 |